United States Patent
Seidel

(10) Patent No.: US 9,481,126 B2
(45) Date of Patent: Nov. 1, 2016

(54) METHOD FOR PRODUCING AN ELECTRICAL INSULATION MATERIAL, ELECTRICAL INSULATION MATERIAL AND ELECTRICAL MACHINE

(75) Inventor: Christian Seidel, Schwaig (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 696 days.

(21) Appl. No.: 13/825,423

(22) PCT Filed: Aug. 31, 2011

(86) PCT No.: PCT/EP2011/065020
§ 371 (c)(1),
(2), (4) Date: Mar. 21, 2013

(87) PCT Pub. No.: WO2012/038220
PCT Pub. Date: Mar. 29, 2012

(65) Prior Publication Data
US 2013/0180756 A1     Jul. 18, 2013

(30) Foreign Application Priority Data
Sep. 22, 2010   (DE) .................. 10 2010 041 198

(51) Int. Cl.
*B29C 65/00*    (2006.01)
*B29C 71/02*    (2006.01)
*H01B 3/30*     (2006.01)
*H02K 3/30*     (2006.01)

(52) U.S. Cl.
CPC .................. *B29C 65/00* (2013.01); *H01B 3/30* (2013.01); *H01B 3/308* (2013.01); *H02K 3/30* (2013.01); *B29C 71/02* (2013.01); *Y10T 428/31504* (2015.04)

(58) Field of Classification Search
None
See application file for complete search history.

(56) References Cited

U.S. PATENT DOCUMENTS

| 6,064,007 A | 5/2000 | Bernstein |
| 2002/0047413 A1* | 4/2002 | Leijon ...................... H01F 3/10 |
| | | 310/112 |
| 2008/0284262 A1 | 11/2008 | Montgomery |
| 2008/0286591 A1 | 11/2008 | Hollberg |

FOREIGN PATENT DOCUMENTS

| CN | 1575232 A | 2/2005 |
| DE | 69229326 T2 | 11/1999 |
| EP | 0072210 A1 | 2/1983 |
| EP | 0778316 A2 | 6/1997 |
| RU | 51275 U1 | 1/2006 |
| RU | 93573 U1 | 4/2010 |
| SU | 1080239 A1 | 3/1984 |
| WO | WO 2006122604 A1 | 11/2006 |

* cited by examiner

*Primary Examiner* — Ramsey Zacharia
(74) *Attorney, Agent, or Firm* — Henry M. Feiereisen LLC.

(57) ABSTRACT

A method for producing an electrical insulation material includes the steps: providing a liquid-crystalline polymer; shaping the liquid-crystalline polymer to give an insulation film in such a manner that the mesophase of the liquid-crystalline polymer is present in the insulation film, whereby the molecules of the polymer are aligned in a preferred direction in the insulation film; laminating a plurality of insulation films to give a layer complex forming the electrical insulation material, wherein the layer complex has at least one insulation film which differs in the preferred direction of the molecules thereof from the preferred direction of the molecules of another insulation film.

7 Claims, 1 Drawing Sheet

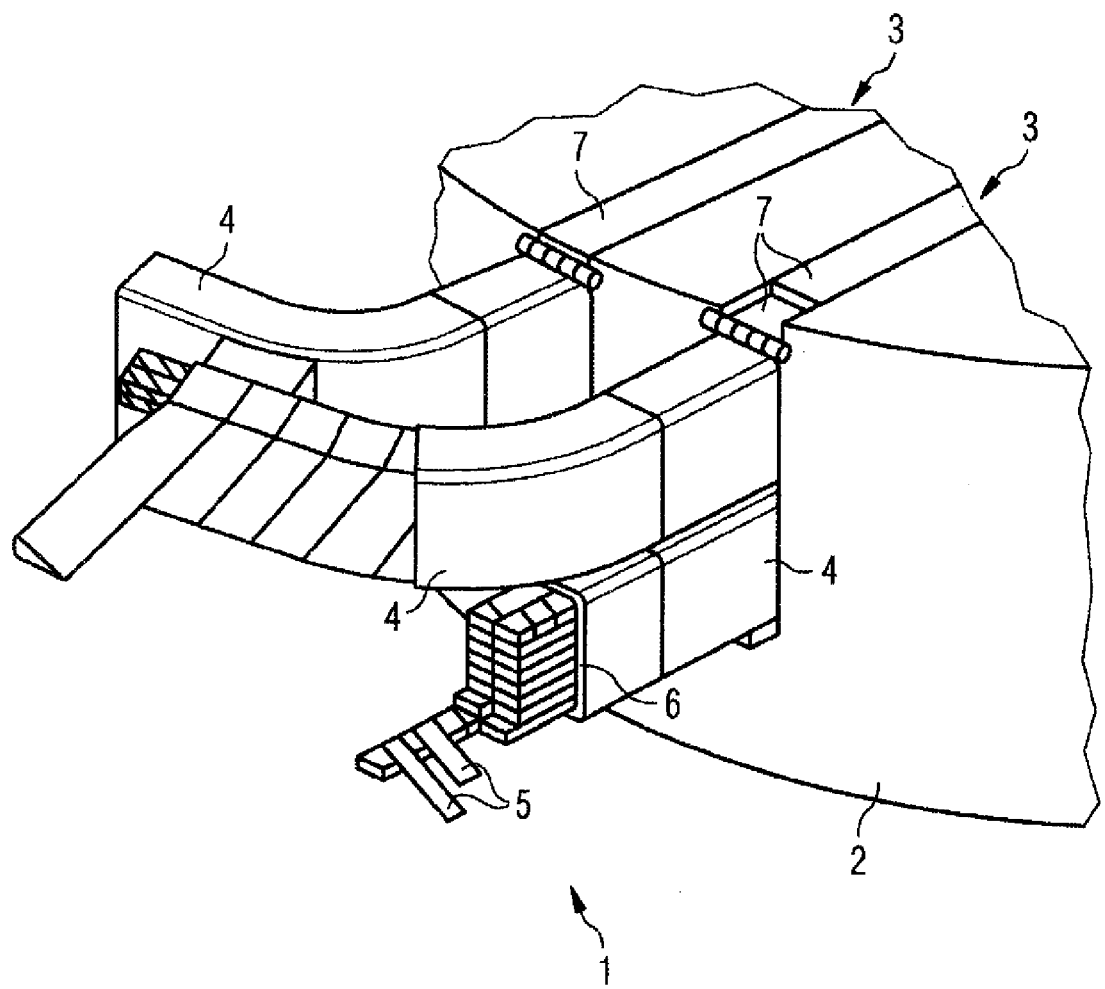

METHOD FOR PRODUCING AN ELECTRICAL INSULATION MATERIAL, ELECTRICAL INSULATION MATERIAL AND ELECTRICAL MACHINE

CROSS REFERENCES TO RELATED APPLICATIONS

This application is the U.S. National Stage of International Application No. PCT/EP2011/065020, filed Aug. 31, 2011, which designated the United States and has been published as International Publication No. WO 2012/038220 and which claims the priority of German Patent Application, Serial No. 102010041198.1, filed Sep. 22, 2010, pursuant to 35 U.S.C. 119(a)-(d).

BACKGROUND OF THE INVENTION

The invention relates to a method for producing an electrical insulation material and the electrical insulation material and an electrical machine with an insulation made of the electrical insulation material.

For an electrical machine, such as for example a generator in a power plant for the generation of electrical energy, a high level of efficiency and a high degree of availability are called for. As a rule, these result in high levels of mechanical, thermal and electrical stress on the components of the turbo generator. The turbo generator has in particular a stator winding, which is subject to especially demanding requirements in terms of stability and reliability. In particular at the interface between the main insulation and the laminated core of the stator winding, the insulation system of the stator winding is exposed to high levels of operational thermal, thermomechanical, dynamic and electromechanical stress, as a result of which there is a high risk of damage to the insulation system of the stator winding by partial discharging, which occurs continuously during operation of the electrical machine. By means of the insulation system, electrical conductor (wires, coils, rods, strands) are permanently insulated against each other and against a laminated core of the stator or the environment.

In light of the exacting mechanical, thermal and electrical requirements only a few materials can be considered for the insulation system, in particular composite materials. As a rule these composite materials generally have an artificial resin and a carrier layer impregnated with the artificial resin, possibly Aramid webbing. As the operational safety of the electrical machine is substantially determined by the reliability of this insulation system, maximum durability of the insulation system is desirable.

SUMMARY OF THE INVENTION

The object of the invention is to propose a method for producing an electrical insulation material, to create an electrical insulation material produced using this method and an electrical machine insulated with this electrical insulation material, which have improved mechanical and electrical insulation properties compared with conventional insulation systems or machines insulated with these conventional insulation systems, in particular in terms of tensile strength, of elasticity module and dielectric properties.

According to one aspect of the present invention, the object is solved by a method for producing an electrical insulation material having the following steps: Provision of a liquid crystal polymer; forming of the liquid crystal polymer into an insulation film in such a way that the mesophase of the liquid crystal polymer is present in the insulation film, as a result of which the molecules of the polymer in the insulation film are aligned in a preferred direction; lamination of a multiplicity of insulation films into a layer complex forming and electrical insulation material, wherein the layer complex has at least one insulation film, which differs in the preferred direction of its molecules to the preferred direction of the molecules of another insulation film.

According to another aspect of the present invention, the object is solved by an electrical insulation material for an electrical machine, wherein the electrical insulation material is produced from a multiplicity of electrical insulation films based on a liquid crystal polymer by a method as set forth above, wherein the electrical insulation material is suitable for application to an electrical conductor of the electrical machine and for the insulation of an electrical current running through the electrical conductor.

According to yet another aspect of the present invention, the object is solved by an electrical machine which includes at least one electrical conductor and an electrical insulation material as set forth above, wherein the conductor is surrounded by the electrical insulation material for the insulation of an electrical current running through the electrical conductor.

Advantageous developments of the invention are described in the dependent claims.

Upon the melting of the liquid crystal polymer (LCP) from its solid phase to its liquid, isotropic phase, a liquid crystal, anisotropic interim status occurs, the mesophase. In the mesophase, the liquid crystal polymer has a preferred direction of alignment of the molecules of the liquid crystal polymer. During setting of the liquid crystal polymer back to a solid, this alignment of molecules is retained. A solid body thus comes into being, whose molecules behave in a similar manner to the fibers of a matrix. In light of the mechanical properties of the liquid crystal polymer thus arising, this is known as a self-strengthening polymer.

By means of the inventive method a multiplicity of preferred directions are embodied in the layer complex, by means of which the electrical insulation material can be stressed in different directions without incurring damage. The inventive method enables the utilization of the liquid crystal polymer for the electrical insulation material in such a way that its outstanding mechanical properties, which have their origins in the strong intermolecular cohesion of the molecules of the liquid crystal polymer, can be rendered usable for an electrical insulation. The individual insulation films can be embodied in thin form, without the rigidity of the layer package being excessively impaired. Thus by means of the inventive method the liquid crystal polymer is suitable for use in the electrical insulation of the electrical machine. Furthermore, the electrical insulation material produced with the inventive method demonstrates favorable dielectric properties for the electrical insulation of the electrical machine.

The inventive method preferably has the following step: Thermal post-processing of the layer complex in such a way that the anisotropy of the mechanical properties of the electrical insulation material resulting from the different preferred directions of the molecules in the insulation film is moderated. Thus in addition to the lamination of the insulation film into the package of layers, a further method step for controlling in particular the mechanical properties of the electrical insulation material is created. The mechanically adapted electrical insulation material produced with the inventive method can thus be embodied in thin form, as a result of which a high level of insulation efficiency is achieved with minimal material usage.

The electrical insulation material produced with the inventive method can be shaped, wherein a shaping of the electrical insulation material preferably takes place during the thermal post-processing. This step preferably takes place by means of a calender roller and/or a press.

In the case of the electrical insulation material for the electrical machine, the electrical insulation material is produced from a multiplicity of electrical insulation films based on a liquid crystal polymer according to the inventive method and the electrical insulation material is suitable for application to an electrical conductor of the electrical machine and for the insulation of an electrical current through the electrical conductor. To this end the electrical insulation film is preferably embodied in the form of a band.

Further in the case of the electrical machine with at least one electrical conductor, the latter is surrounded by the inventive electrical insulation material for electrical insulation purposes. The electrical machine preferably has a stator package with at least one groove, in which the electrical conductor surrounded by the electrical insulation material is arranged.

BRIEF DESCRIPTION OF THE DRAWING

There follows an explanation of a preferred embodiment of an electrical machine, which is insulated with the inventive electrical insulation material, on the basis of the attached schematic drawing. The FIGURE shows a perspective representation of a stator of the electrical machine with a multiplicity of electrical conductors surrounded with the inventive electrical insulation material.

DETAILED DESCRIPTION OF PREFERRED EMBODIMENTS

The FIGURE shows a section of a stator 1 of an electrical machine which is not shown in greater detail, in the present case a turbo generator for the generation of electrical energy. The stator 1 comprises a stator package 2 with a multiplicity of grooves 3 and a multiplicity of electrical conductors 4, which in each case run within the grooves 3.

Each of the conductors 4 has an electrical insulation. The electrical insulation in each case comprises a strand insulation 5, a main conductor insulation 6 and for each of the grooves 3 a groove closure 7. The electrical insulations are effected with an electrical insulation material, which have been produced in the form of a band with the inventive method.

In the case of the method, thin insulation films are formed, wherein the insulation films are formed from liquid crystal polymer in such a way that the molecules of the polymer are aligned in a preferred direction. A multiplicity of insulation films thus formed are laminated in a further step into a layer complex, in such a way that at least one insulation film differs in the preferred direction of its molecules from the preferred direction of the molecules of the other insulation film. The layer complex made up of the insulation film is formed in the manner of a band into the electrical insulation material. Furthermore, in order to adapt the mechanical properties of the electrical insulation material, this is thermally post-processed after the lamination, by means of which the mechanical properties, which as a result of the set preferred direction are previously heavily dependent upon the direction, are adjusted in such a way that the directional dependence (anisotropy) of the mechanical properties is moderated in a predetermined manner. The inventive electrical insulation material can thus have mechanical properties adapted to a particular application.

The table below shows the properties of the electrical insulation material formed from the liquid crystal polymer compared with a conventional insulation material, a film made of NOMEX®.

As can be seen from the table, although the inventive electrical insulation material has a greater thickness and a lower fracture strain, it nevertheless displays advantages in its important technical application-related properties. Its tensile strength for example is greater than in the case of the reference products. The inventive electrical insulation material can thus withstand high stresses for longer than conventional insulation material. The inventive electrical insulation material can thus be provided with a lesser layer thickness than regular insulation material.

The inventive electrical insulation material also has a comparable dielectric loss factor to conventional insulation material and a similar dielectric number, as a result of which the inventive electrical insulation material is particularly suitable for the insulation of an electrical machine.

Furthermore, the inventive electrical insulation material has a lower coefficient of heat expansion and a comparable continuous operating temperature, as a result of which the electrical insulation material is also superior to regular insulation material as regards its service temperature range.

TABLE

Comparison of material properties of a conventional insulation material, a film made of NOMEX ® (NOMEX ®) and an inventively produced electrical insulation material (LCP).

| Property | Test method | Unit | NOMEX ® (250 μm) | LCP (Bulk) |
|---|---|---|---|---|
| Thickness | ISO 1182 | g/cm3 | 1.1 | 1.4 |
| Absorption of water (23° C./ 24 h/50% RF) | ISO 62 | % | 0.1 | 0.03 |
| Tensile strength | ISO 527-2/1A | MPa | 110 (MD) | 182 (MD) |
| Fracture strain | ISO 527-2/1A | % | 18 (MD) | 3.4 (MD) |
| Glass transition temperature (Tg) | ISO 11357 | ° C. | | 110 |
| Coefficient of heat expansion (T < Tg) | ISO 11359 | ppm/° C. | 20 | 10 |
| Continuous operating temperature | UL 746B | ° C. | 220 | 220 |
| Dielectric loss factor at 1 MHz | IEC 60250 | — | Approx. 0.02 | 0.02 |
| Dielectric number | IEC 60250 | — | 3.7 | 3.0 |

What is claimed is:

1. A method for producing an electrical insulation material, comprising:

forming a liquid crystal polymer into an insulation film by melting of the liquid crystal polymer from a solid phase to a mesophase in such a way that the mesophase of the liquid crystal polymer is present in the insulation film, thereby aligning molecules of the liquid crystal polymer in the insulation film in a preferred direction;

laminating a plurality of said insulation film into a layer complex forming an electrical insulation material, with at least one of the insulation films of the layer complex having molecules aligned in a preferred direction which differs from a preferred direction of the molecules of a different one of the insulation films; and thermally post-processing of the layer complex to moderate an anisotropy of mechanical properties of the electrical insulation material stemming from different preferred directions of the molecules in the insulation film.

2. The method of claim 1, further comprising shaping the electrical insulation material while the layer complex undergoes thermal post-processing.

3. The method of claim 1, wherein the thermal post-processing is realized using a calender roller and/or a press.

4. An electrical insulation material for an electrical machine, comprising a plurality of electrical insulation films based on a liquid crystal polymer and produced by melting of the liquid crystal polymer from a solid phase to a mesophase in the insulation films to thereby align molecules of the liquid crystal polymer in the insulation film in a preferred direction, with the electrical insulation films being laminated into a layer complex, and with at least one of the insulation films of the layer complex having molecules aligned in a preferred direction which differs from a preferred direction of the molecules of a different one of the insulation films, with the layer complex thermally processed to moderate an anisotropy of mechanical properties of the electrical insulation material stemming from different preferred directions of the molecules in the insulation film, wherein the electrical insulation material is configured for application to an electrical conductor of the electrical machine and for insulation of an electrical current running through the electrical conductor.

5. The electrical insulation material of claim 4, wherein the electrical insulation films are each embodied in the form of a band.

6. An electrical machine, comprising:
at least one electrical conductor; and
an electrical insulation material surrounding the electrical conductor for insulating an electrical current running through the electrical conductor, said electrical insulation material comprising a plurality of electrical insulation films based on a liquid crystal polymer and produced by melting of the liquid crystal polymer from a solid phase to a mesophase in the insulation films to thereby align molecules of the liquid crystal polymer in the insulation film in a preferred direction, with the electrical insulation films being laminated into a layer complex, and with at least one of the insulation films of the layer complex having molecules aligned in a preferred direction which differs from a preferred direction of the molecules of a different one of the insulation films, with the layer complex thermally processed to moderate an anisotropy of mechanical properties of the electrical insulation material stemming from different preferred directions of the molecules in the insulation film.

7. The electrical machine of claim 6, further comprising a stator package having at least one groove for receiving the electrical conductor surrounded by the electrical insulation material.

\* \* \* \* \*